United States Patent [19]
Webb

[11] Patent Number: 5,675,899
[45] Date of Patent: Oct. 14, 1997

[54] ROTARY SAW WITH LASER BEAM ALIGNMENT

[76] Inventor: James Webb, 877 Ave. B, Redondo Beach, Calif. 90277

[21] Appl. No.: 653,774

[22] Filed: May 28, 1996

[51] Int. Cl.⁶ .............................. B23D 47/00; B27B 5/29
[52] U.S. Cl. .................. 30/390; 30/391; 30/392; 83/520
[58] Field of Search ..................... 30/388, 389, 390, 30/391, 392; 83/520

[56] References Cited

U.S. PATENT DOCUMENTS

| | | | |
|---|---|---|---|
| 4,833,782 | 5/1989 | Smith | 30/392 |
| 4,885,967 | 12/1989 | Bell et al. | 83/520 |
| 5,038,481 | 8/1991 | Smith | 30/392 |
| 5,375,495 | 12/1994 | Bosten et al. | 83/520 |
| 5,461,790 | 10/1995 | Olstowski | 30/391 |

FOREIGN PATENT DOCUMENTS 3922849  1/1991  Germany ........................ 30/390

*Primary Examiner*—Hwei-Siu Payer
*Attorney, Agent, or Firm*—Roger A. Marrs

[57] ABSTRACT

A rotary saw having a housing equipped with a laser beam generator and an end cap with a slit through which a laser beam projects in alignment with a rotating cutting blade of the saw. The housing is mounted on the body of the saw immediately over the blade guard and the end cap is rotatably disposed on the housing whereby the emitted laser beam from the slit may be directed in alignment with the saw blade cut anywhere along a 180 degree angular path extending from the line of cut in front of the saw blade to a target remotely located above the saw. The saw blade can be directed to follow the target in order to align the cut with the target.

6 Claims, 1 Drawing Sheet

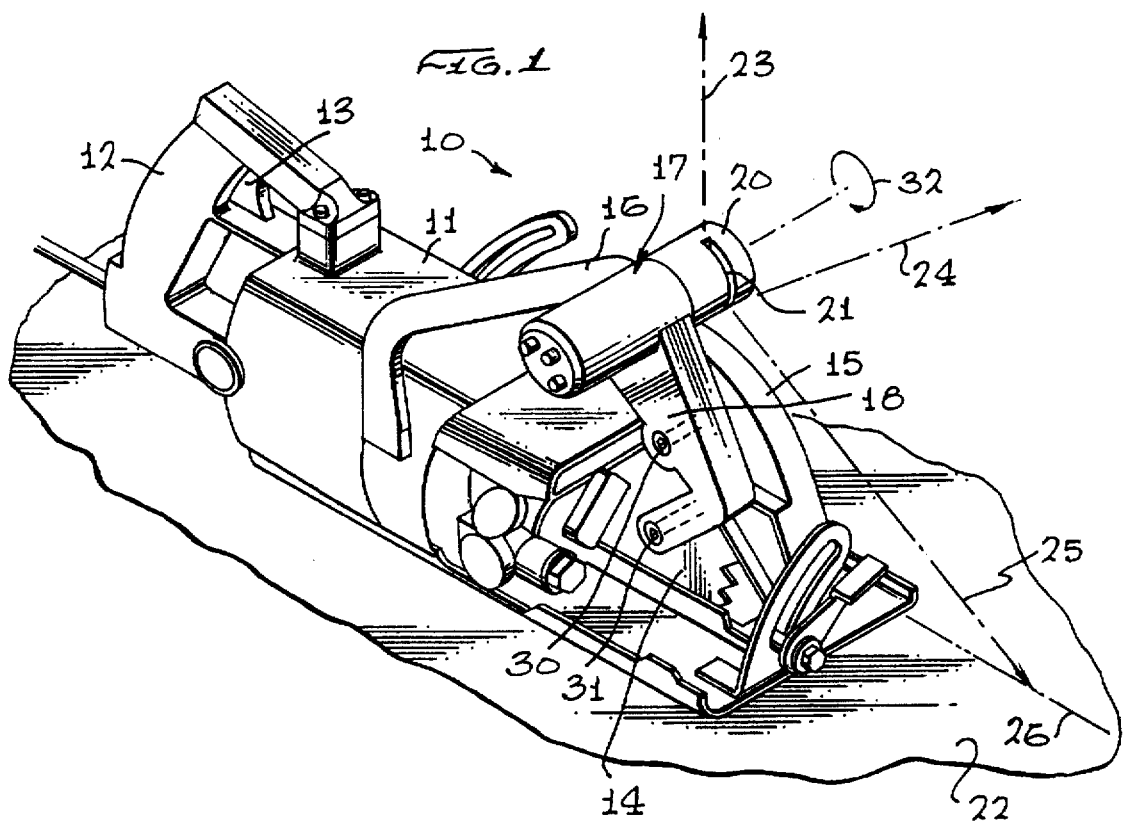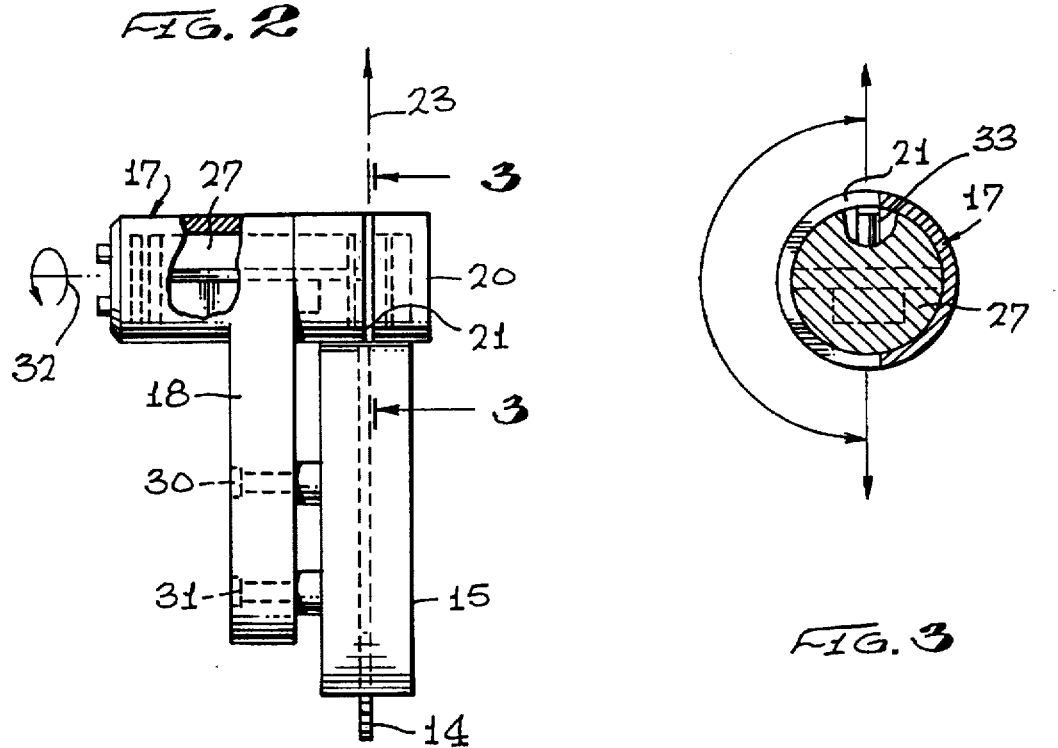

ROTARY SAW WITH LASER BEAM ALIGNMENT

BACKGROUND OF THE INVENTION

1. Field of the Invention

The present invention relates to the field of rotary saws, and more particularly to a novel guide and alignment means for ensuring the cutting of a work piece along a path in alignment with a remote guide.

2. Brief Description of the Prior Art

In the past, it has been the conventional practice when cutting a work piece, such as a sheet of lumber, to scribe a line on the surface of the sheet so that the operator of a rotary blade saw may follow the line ensuring that the cut will occur along this line. In other instances, where applicable, the body of the rotary saw may include a flange which slides against an existing or installed guide, such as a strip of wood or a wall structure, so that the cut of the blade follows the contour of the guide or wall. In other more specific applications, it is necessary that the cut in the panel or wood, such as a floor, be in alignment with a target line that is carried on the ceiling of a room. In order to achieve alignment, the operator must drop alignment strings or tapes from the ceiling and then reconstruct a guideline on the floor so that the operator may then follow the guideline to make the cut.

The above attempts to provide an alignment and guide means for cutting material present problems and difficulties which stem largely from the fact that time and expertise is required to lay out a pattern over which the rotary saw must be driven by the operator. Also, the operator is required to concentrate his observation immediately ahead of the cutting blade as the blade is pushed along the prescribed and prepared guideline.

Therefore, a long-standing need has existed to provide a novel means by which the operator of a rotary saw can follow a guide or target line without concentrating on the work piece being cut immediately ahead of the saw. Also, such a means should eliminate the requirement for special measuring and/or the necessity for an independent guideline to be followed. Such a means would properly align the cutting edge of the rotary saw with a target guide that may be remotely located from the work piece.

SUMMARY OF THE INVENTION

Accordingly, the above problems and difficulties are avoided by the present invention which provides a novel rotary saw having a housing which contains a rotatable end piece provided with a slit through which a laser beam projects onto a selected surface serving as a guide for making the cut. A laser beam generator is disposed within the housing and the housing is detachably carried on the body of the rotary saw immediately adjacent to the cutting blade guard so that the slit in the end cap or element is in alignment with the cutting edge of the blade. Therefore, the laser beam lies on the cutting edge of the blade. By providing the slit in the end piece as a 180 degree opening, the end piece may be rotated so that the beam projects through the slit anywhere from a horizontal position to a 90 degree or more position in the vertical aspect. Therefore, the operator need only align the projected laser beam along a guideline such as an edge in the ceiling or along a prepared line on the wall wherein the cutting edge will therefore be in alignment therewith and the cut produced will follow the guide in alignment of the beam with the target line.

Therefore, it is among the primary objects of the present invention to employ an alignment and guide means for a rotary blade saw wherein the projected laser beam follows a target line and wherein the beam is in alignment with the cutting blade so that the cut in a work piece follows the target line as determined by the operator.

Another object of the present invention is to provide a guide means for aligning the cutting blade or edge of a rotary saw with a remote guideline or target line employing a laser beam projected from the saw to the target line so that the blade will follow accordingly.

Yet another object of the present invention is to provide a novel rotary saw having a laser beam generator adapted to project a laser beam through a slit in a rotary end cap so that the beam may be directed against a remote target line or guideline wherein the cutting edge of the blade will be directed along the guideline by the saw operator.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of a rotary saw incorporating the laser beam alignment and guide means of the present invention;

FIG. 2 is an enlarged front elevational view of the alignment and guide means used in the saw of FIG. 1; and FIG. 3 is a transverse cross-sectional view of the laser beam alignment and guide means shown in FIG. 2 as taken in the direction of arrows 3—3 thereof.

DESCRIPTION OF THE PREFERRED EMBODIMENT

Referring to FIG. 1, the novel rotary saw is indicated in the general direction of arrow 10 which includes a body 11 that supports a handle 12 intended to be grasped by the saw operator. The handle also includes a trigger 13 intended to be depressed by the operator so as to start and stop rotation of a rotary saw blade 14 as shown in FIG. 2. The saw blade 14 is enclosed within a shield or guard 15 that is carried on the body 11 and a stabilizing handle 16 is carried on the saw body intended to be grasped by the other hand of the operator.

Immediately adjacent to the blade guard 15, a laser beam housing 17 is mounted to the body via a support arm 18. An end cap or element 20 is carried on the housing 17 and projects beyond the support arm 18 over the blade guard 15. The end cap or element 20 is rotatable with respect to the housing 17 and includes a curved slot 21 which is approximately 180 degrees of an opening. It is critical that the slot 21 be in alignment with the rotating blade 14 and such an alignment is illustrated in FIG. 2.

FIG. 1 also illustrates that the saw 10 is slidably supported on a work piece 22 which may take the form of a panel or the floor of a room. It is also illustrated that the housing 17 encloses a laser beam assembly including a beam generator which emits a laser beam, such as represented by numerals 23 for a vertical beam, 24 representing an angular beam issuing from the end cap 20, and another angular beam 25 emitting from the same slot. It is to be understood that not all three beams are emitted at the same time and that each of the respective beams to be described are singular and are directed towards different targets depending on the work to be performed. For example, if a saw line is intended to be followed on panel or floor 22, such as indicated by the line 26, the beam 25 is directed to follow along line 26 under the observation of the operator as the saw blade cuts the work piece. In this manner, the operator does not have to observe the exact front cut of the saw blade as it follows the line 26, but rather the operator needs only to visually align the beam 25 with the guideline 26 to ensure that the saw blade 14 will follow the line 26. In another application, it is sometimes necessary to provide a cut on the floor or a wood piece so that the cut is in alignment with a target or guideline on the ceiling of a roof. In this instance, the beam 23 would be directed upwardly to the target guideline on the ceiling and again, the operator need only visually align and follow the guideline on the ceiling through the observation of beam 23 on the guide. The operator would be assured that the cut made from the blade 14 will follow the alignment of the beam 23 with the guide or target line on the ceiling. In still another application, it can be seen that the beam 24 may be transmitted so as to follow another target or guideline. It is also to be understood that the laser beam generator may provide a segmented beam which would exist between the vertical edge beam 23 with the opposite beam 25 of the segment. Such a beam may be provided by the slit 21 which is illustrated as being continuous between its opposite ends. However, to separate the beams 23, 24 and 25 from each other, spacers may be placed within the slit to provide such a division so that a plurality of apertures arranged in a series are provided.

Referring now in detail to FIG. 2, it can be seen that the housing 17 encloses a conventional laser assembly 27 and that the assembly includes an outlet for the generated beam through the slit 21. The support arm 18 carrying the housing 17 is attached to the side of blade guard 15 by fasteners 30 and 31 respectively. The laser assembly 27 may include an internal battery or outside power may be provided as desired. The entire laser beam assembly may be disconnected from the housing 17 by rotation of the assembly which is in threaded engagement with an internal bore or chamber of the housing. Such rotation is indicated by numeral 32.

Referring now in detail to FIG. 3, it can be seen that the laser beam generator includes a beam discharge tube 33 and that the beam may be rotated through the slot 21 by turning of the assembly, as previously described. In such an instance, the beam may be directed to a particular target selected by the operator for guiding purposes. In this instance, separate spacers are not needed in order to segment or provide a series of apertures in the slot 21. In this instance, the beam discharge tube 33 is positioned by the operator to the desired location. The assembly is broadly shown by FIGURE number 27 and it is to be understood that the laser beam generator or assembly is not a part of the present invention except as a generating beam source.

In view of the foregoing, it can be seen that the operator may adjust the issuance of the laser beam by rotation of the beam generating assembly 27 so that the tube 33 emits the beam to a desired guideline or target line. It is important to note that the tube or light beam discharge device 33 is in alignment with the slot 21 so that the beam will exit the end cap 20 and project to a target line or area under the observation of the operator. The guideline, such as beam 23, is in direct alignment with the cutting blade 14 so that the cut produced will follow the guide or target line held in alignment by the operator through the beam 23.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A power tool equipped with a laser guide for moving along a linear path comprising:

said power tool movable along a linear path;

a housing mounted on said power tool and having a slit in alignment with said linear path;

a laser beam device movably carried in said housing emitting a laser beam exterior of said housing via said housing slit so as to be in alignment with a remote and spaced apart target;

said housing includes a cylindrical end cap rotatably carried on said housing; and said slit provided in said end cap whereby said emitted laser beam passes through said slit directed in alignment with said linear path anywhere along a 180-degree angular path extending from said linear path ahead of said power tool.

2. The invention as defined in claim 1 wherein:

said power tool is a power saw having a rotary blade and said linear path is defined by a rotary blade cutting line intended to be cut ahead of said power saw.

3. The invention as defined in claim 2 including:

a laser beam generator included in said laser beam device having a beam discharge tube in alignment with said slit in said end cap so as to direct said laser beam through said slit between opposite ends of said slit to define an angle between said target and said linear path.

4. The invention as defined in claim 3 including:

an angular mounting securing said housing to said power saw disposing said end cap over said blade and maintaining said slit in alignment with said linear path.

5. The invention as defined in claim 4 wherein:

said power saw includes a body enclosing a motor and a blade guard partially disposed over said blade;

said end cap disposed over said blade guard to align said slit with said blade, said cutting line, said linear path and with said target.

6. The invention as defined in claim 5 wherein:

said target is an elevated linear line disposed above and remotely located from said rotary blade cutting line.

* * * * *